United States Patent Office 3,798,331
Patented Mar. 19, 1974

3,798,331
NEUTRAL FERMENTED ALCOHOLIC BEVERAGE
Vincent S. Bavisotto, Simsbury, Conn., and Joseph J. Tschida, Jr., Cumberland, Wis., assignors to Theodore Hamm Company, St. Paul, Minn.
No Drawing. Continuation-in-part of abandoned application Ser. No. 810, Jan. 5, 1970. This application Sept. 13, 1972, Ser. No. 288,849
Int. Cl. C12c 11/00
U.S. Cl. 426—16           4 Claims

ABSTRACT OF THE DISCLOSURE

A neutral tasting fermented alcoholic base substrate is prepared by yeast-fermenting a boiled aqueous medium containing malt or malt extract, glucose, hop extract or hops, soya flakes and inorganic salts.

CROSS-REFERENCE TO RELATED APPLICATION

This application is a continuation-in-part of our copending application Ser. No. 810 filed Jan. 5, 1970 and now abandoned.

BACKGROUND OF THE INVENTION

Neutral tasting alcoholic beverages have been utilized to provide flavored alcoholic beverages of various description such as "Tom Collins," "Coffee," mint, etc. In order to provide a neutral alcoholic base suitable for use to provide flavored alcoholic beverages, one has to remove the natural beer flavor or malt liquor flavor from the fermented alcoholic beverage. If this is not done the beer or malt liquor flavor will be superimposed on the second desired flavor.

Two methods have been proposed for eliminating the natural beer flavor from a fermented alcoholic beverage to provide a neutral base for flavored alcoholic beverages. The first method is to ferment natural beer and then eliminate the flavor of the beer by charcoal filtration. However, this method has not proven too successful in practice and leaves much to be desired from an economic standpoint.

Another means for producing a neutral base has been by fermenting an extract of unboiled, unhopped wort from a mash containing 60% malt and 40% grits and a fermentable sugar.

This process using an unhopped, unboiled wort to achieve a neutral base would be impractical and very uneconomical. It has been found that in order to produce products of this type, a three to six week time cycle must be utilized. Furthermore, the production of a neutral base from an unhopped, unboiled wort has entailed the use of expensive equipment such as a mash tank, lauter tun, etc. However, more important than these economic and process considerations has been the fact that the production of a neutral base from the extract of unboiled, unhopped wort by this method is not bland enough for subsequent addition of many flavors. This is true since this process requires significant levels of malt, i.e., above 60% by weight. Therefore, in order to provide a neutral base by this process, there must be some masking of the malt-derived flavor. Further, this process does not provide a sterile wort for fermentation, as wort boiling is omitted. By omitting wort boiling, this process would also very likely give rise to a product having poor colloidal stability. Shelf-life of such a product would be extremely limited, as a result.

SUMMARY OF THE INVENTION

In accordance with the instant invention, a neutral tasting fermented base can be prepared by yeast-fermenting a boiled aqueous medium containing a fermentable carbohydrate from one or more sources and a food grade material having a high soluble protein content. The neutral base is prepared by adding a high protein containing edible food source material and a fermentable carbohydrate to water, boiling the thus obtained mixture with or without added hops or hop extract, cooling said mixture, adding yeast to the cooled boiled mixture, allowing the cooled mixture to ferment to completion, cooling the fermented mixture, and separating the solids from the fermented mixture.

The neutral base produced in accordance with this invention is completely bland by the virtue of the fact that it can be produced with no malt or up to 25% malt, based on the weight of fermentable materials used, and any fermentation-derived flavor notes can be removed by the purging with carbon dioxide. Furthermore, by means of the process of this invention, a neutral fermented alcoholic base wthout any noticeable flavors can be produced without the need for treatment by activated carbon or charcoal. Where little or no malt is utilized in preparing the neutral fermented alcoholic base of this invention, the time cycle is significantly reduced, i.e., seven to seventeen days. A shortened cycle such as this increases production capacity and is more economical. The microbiological quality of the in-process base and also of the finished base is excellent. Further, the colloidal stability of the finished base significantly surpasses that of conventionally produced malt beverages.

However, where the malt content and the hops content are near the maximum (ranges are given below) the use of activated charcoal at one stage of the process is desirable.

Furthermore, the above process for producing a neutral tasting fermented base allows for a simple and economical method for the production of an alcoholic beverage of significantly reduced caloric content. This is especially true since according to one embodiment of the invention, no malt need be utilized. Furthermore, the neutral base produced in accordance with this invention is essentially colorless and very bland even when the malt and hops content are at the maximum of the ranges specified. Color and flavor may be added, if desired, at a uniform level of addition. Additionally, the neutral base produced in accordance with this invention allows for complete control of foam as the base shows negligible foaming properties. If a foam should be desired, it can be controlled at a uniform level by adding appropriate foam additives.

DESCRIPTION OF THE PREFERRED EMBODIMENTS

In preparing the neutral base of this invention, any food grade material having a high soluble protein content can be utilized as a source of nitrogen and yeast stimulant. Generally, these food grade materials should have a soluble protein content of at least 35% by weight, preferably from about 40% by weight to 50% by weight, based upon the weight of the food grade material. A preferred food grade material in accordance with this invention are materials derived from soya bean, such as soya flakes. The food grade material having a high protein content utilized in accordance with this invention is added to an aqueous medium in an amount of from about 0.05% to about 0.2% by weight, based upon the weight of the total fermentation medium.

The aqueous fermentation medium in accordance with this invention should contain a fermentable carbohydrate from one or more sources. Any commercially available fermentable carbohydrate source such as a mixture of a sugar such as glucose, sucrose, converted corn syrup, etc.

can be utilized. From 1 to 25% malt, based on the weight of fermentable materials used, may also be included. The malt may be replaced, if desired, with an equivalent amount of malt extract. In accordance with this invention, the fermentable carbohydrate is present in an amount of from about 2% by weight to about 20% by weight, based upon the weight of the aqueous fermentation medium.

The fermentation medium is produced in accordance with this invention by adding the food grade material of high soluble protein content and the fermentable carbohydrate to an aqueous medium. The water in the fermentable aqueous medium can, in accordance with this invention, vary from about 75% by weight to 95% by weight. Furthermore, if desired, from about 1% by weight to about 25% by weight, based upon the weight of the fermentable materials, of malt or the equivalent of malt extract can be added to the fermentation medium. The malt or malt extract is an optional ingredient. Care should be taken not to add malt in excess of about 25% by weight (or equivalent malt extract) of the fermentable materials since the addition of excess malt or malt extract prevents the formation of a neutral tasting product and provides a flavor which in neutral bases is undesirable. Also, from 0.0213 to 0.0319% of hops may be added. This amounts to .050 to .075 lb. of hops per standard barrel.

Prior to the addition of the yeast, the aqueous fermentation medium should be boiled. In this manner, a sterile aqueous fermentation medium is supplied which when fermented with yeast will provide a neutral tasting fermented beverage.

The fermentation medium can also contain, if desired, various inorganic ammonium alkali metal and alkaline earth metal salts such as calcium sulfate, potassium chloride and ammonium phosphate. These salts are water corrective salts which have an important effect in controlling the pH, stability and flavor of the finished product. Different formulations of salts can be utilized, depending upon the hardness and acidity of the water being utilized. However, in certain cases, depending upon the water being utilized, no water corrective salts need be utilized. If desired, these salts are added to the fermentation medium in an amount of from about 0.04% to about 0.06% by weight, based upon the weight of the fermentation medium.

After the fermentation medium has been boiled and cooled to between 45° F. and 70° F. yeast is added to the fermentation medium to cause the fermentation medium to ferment. Any conventional yeast utilized in making beers, such as *Saccharomyces cerevisiae*, can be utilized. Fermentation can be carried out in the conventional manner by allowing the fermentation medium containing the yeast to stand at a temperature of 45° F. to about 70° F. for a period of from three to fourteen days. Generally, it is preferred to utilize a fermentation temperature of from about 50° F. to 65° F.

After the fermentation is completed, an agglomerating agent can be added to the fermentation medium in order to expedite the settling of the yeast and suspended solids so as to cause both the yeast and the suspended solids to precipitate out in a relatively short period of time. Any conventional agglomerating agent can be added to the fermented aqueous medium. Among the conventional agglomerating agents are included gelatin, fish collagen, etc.

Prior to filtration, the fermented aqueous medium can be cooled to a temperature of from 30° F. to about 50° F. This aids in the precipitation of the solids and yeast from the fermented liquid. The medium is then filtered through diatomaceous earth.

Where the malt content and the hops content are toward the upper end of the specified ranges, activated carbon, preferably Brewer's grade Darco BG (Atlas Chem. Ind., Inc. Wilmington, Delaware) may be added in a proportion of 0.3 lb./barrel of fermentation medium. The medium is now ready for a second filtration, again preferably through diatomaceous earth.

The liquid obtained upon filtration is a clear neutral fermented liquid. This liquid can, if desired, be purged and carbonated by conventional methods. The fermented neutral base produced in accordance with this invention can be flavored by the addition of various natural and/or artificial flavoring agents or colored by the addition of various conventional coloring agents. Conventional flavoring agents such as cola syrup, fruit syrup, etc. can be added to the neutral base of this invention. If desired, foaming agents and coloring agents, food grade acids, buffer salts and sweeteners can also be added to this neutral base, depending upon the beverage that is desired.

The flavored syrup can be any of the well-known syrups currently used in the soft drink industry as well as other flavored syrups. Moreover, the flavored syrup may be added before or after carbonation. Furthermore, the exact ratio of the flavored syrup may be changed to suit the particular sweetness requirement of the final liquor product desired. After addition of flavoring and carbonation, the flavored alcoholic beverage is then ready for bottling and use.

The following examples are illustrative of the invention.

EXAMPLE 1

0.235 pound of soya flakes, 0.132 pound of Burton salt (a mixture of salts consisting essentially of calcium sulfate, potassium chloride and primary ammonium phosphate) are mixed into 234 pounds of water, by means of power mixers. This quantity corresponds to the contents of a standard beer barrel. During the mixing the aqueous mixture is heated to boiling. The mixture should be boiled for a minimum of about 20 minutes and may be boiled for considerably longer periods if desired. However, such additional boiling accomplishes nothing and is uneconomical. While the mixture is boiling, 24.38 pounds of glucose (powder) are added to the boiling mixture. After all of the glucose (powder) has been added, the aqueous mixture is allowed to boil for 30 minutes while the mixture is being mixed with the power mixer. After this period the mixture is externally cooled with water to 150° F. and with propylene glycol to 60° F. During this cooling period, the mixer is continually run. Also during this cooling period, the aqueous mixture is aerated with sterile filtered air.

When the aqueous mixture has reached 60° F., 6.25 pounds of brewer's yeast are added while mixing is continued. After the yeast has been added, the aqueous mixture is aerated with sterile air for six to seven minutes. After this period, agitation is stopped and the aqueous mixture is allowed to ferment at a controlled temperature of 60° F. for four days. After this period, the fermented mixture is cooled to 30° F. To this cooled mixture there is added 0.0035 pound of fish collagen (Magifloc) under constant stirring and while maintaining the temperature at about 30° F. by external cooling. After the Magifloc has been all added, a clear liquid is obtained which is filtered through a millipore prefilter and 0.8 micron membrane filter to remove the suspended solids therefrom and also to preserve the base from microbiological spoilage.

The fermented liquid can be carbonated with 2.90 volumes of carbon dioxide gas. The base material which has an original gravity of 8.3% and an alcohol content of 4.0% by weight can be stored in sterile containers until needed for making up various flavored products.

It should be noted that in this example no malt is called for; consequently the amount of yeast used is relatively high, to compensate for the lack of nitrogen otherwise introduced by malt.

Also, for large scale production, rather than membrane filtration, filtration through diatomaceous earth after flavoring and pasteurization may be used. Where the flavor may be adversely affected by pasteurization, a preservative, such as n-heptyl p-hydroxy benzoate may be added at a level of 10–12 p.p.m.

EXAMPLE 2

0.235 pound of soya flakes, 0.132 pound of Burton salt, and 0.0188 pound of tetra alba are mixed into 234 pounds of water by means of power mixers. During the mixing, the aqueous mixture is heated to boiling. While the mixture is boiling, 21.33 pounds of dextrose (cerelose) and 4.67 pounds of malt extract (equivalent to 7 pounds of malt) are added to the boiling mixture. After all of the dextrose has been added, the aqueous mixture is allowed to boil for 30 minutes while the mixture is externally cooled. Near the end of this period, 0.0125 pound of hop extract (17% alpha acids equivalent to 0.05 pound of hops) are added. After this period, the mixture is cooled to 60° F. During this cooling period, the mixer is continually run. Also during this cooling period, the aqueous mixture is aerated with sterile filtered air.

When the aqueous mixture has reached 60° F., 3.00 pounds of brewer's pitching yeast are added while mixing is continued. After the yeast has been added, the aqueous mixture is aerated with sterile air for six to seven minutes. After this period, agitation is stopped and the aqueous mixture is allowed to ferment at a controlled temperature of 60° F. for four days. After this period, the fermented mixture is cooled to 30° F. To this cooled mixture there is added 0.0035 pound of fish collagen (Magifloc) under constant stirring and while maintaining the temperature at about 30° F. by external cooling. After the Magifloc has been all added, a clear liquid is obtained which is filtered through a Millipore pre-filter and 0.8 micron membrane filter to remove the suspended solids therefrom and also to preserve the base from microbiological spoilage.

The fermented liquid is passed into a pressure tank. While it is being passed into the pressure tank, it is mixed with caramel color. The caramel color is proportioned into the stream to produce a color of from 1.0° to 2.0° Lovibond.

The liquid is then purged with $CO_2$ and then carbonated with 2.90 volumes of $CO_2$ for two days. After this period, it is transferred to sterile kegs through a Millipore pre-filter and membrane filter. The material is stored until needed for making up various flavored products.

EXAMPLE 3

The process is carried out as in Example 2 up to the point immediately prior to passing the liquid into a pressure tank, except that the quantity of hop extract used is .0187 pound. Since the quantities of malt and hops used are near the upper ends of the specified ranges, it is desirable to add activated carbon. The carbon used is brewer's grade. A suitable carbon is Darco BG made by Atlas Chemical Industries of Wilmington, Delaware. The quantity used is about 0.3 pound barrel of beverage. The carbon is held in the liquid for a period of from 1 minute to about 1 day and is then filtered off through diatomaceous earth into a pressure tank; flavor is added, the beverage is carbonated and finally pasteurized by conventional means.

EXAMPLE 4

A cola-flavored beer can be formulated from the following ingredients:

| Ingredients: | Mls. |
|---|---|
| Neutral base of Example 1 | 6,737.40 |
| Industrial invert syrup at 70° Brix | 757.00 |
| Cola flavor | 37.80 |
| Caramel color | 37.80 |
| | 7,570.00 |

EXAMPLE 5

A neutral base was prepared in the same manner as Example 1 except that 10.28 pounds of glucose (powder) and 249.92 pounds of water were utilized. The final base had an alcohol content of 2.00% by weight and an original gravity of 3.56%.

EXAMPLE 6

A neutral base was prepared in the same manner as Example 1 except that 17.44 pounds of glucose (powder) and 242.56 pounds of water were utilized. The final base had an alcohol content of 3.00% by weight and an original gravity of 5.99%.

EXAMPLE 7

A neutral base was prepared in the same manner as Example 1 except that 31.71 pounds of glucose (powder) and 228.29 pounds of water were utilized. The final product had an alcoholic content of 5.04% by weight and an original gravity of 10.70%.

EXAMPLE 8

A neutral base was prepared in accordance with Example 1 except that 26.16 pounds of converted corn syrup was substituted for glucose (powder) and 233 pounds of water was utilized. The neutral base had an alcohol content of 2.88% by weight.

EXAMPLE 9

A neutral base was prepared in accordance with Example 1 except that 30.30 pounds of glucose concentrate was substituted for glucose (powder) and 229.70 pounds of water was added. The neutral base had an alcohol content of 4.09% by weight.

EXAMPLE 10

A neutral base prepared in the manner of Example 1 except that 21.76 pounds of sucrose was substituted for glucose (powder) and the water added was 238.24 pounds. The alcohol content of the neutral base was 4.14% by weight.

It should be noted that the neutral base prepared as described in Examples 2 and 3 could have been used in Examples 4 through 10 instead of the Example 1 base, making obvious modifications in the quantity of base used. Specifically, smaller quantities of malt and hops than are specified in Examples 2 and 3 could be used for making the various beverages of Examples 4 through 10.

It will thus be seen that the objects set forth above, among those made apparent from the preceding description, are efficiently attained and, since certain changes may be made in carrying out the above process and in the composition set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A boiled aqueous fermentation medium for producing a neutral tasting alcoholic base substrate consisting essentially of from about 2–20% by weight of a fermentable carbohydrate wherein from 1 to 25% of said carbohydrate is malt or equivalent malt extract and the remainder of said 2–20% of fermentable carbohydrate is glucose, from 0.0053 to 0.0080% of hop extract or the equivalent amount of hops, which for a hop extract having 17% alpha acids content is equivalent to about 0.0213 or 0.0319% of hops, from about 0.05 to about 0.20% of soya flakes, and from 0.04 to 0.06% of an inorganic salt selected from the group consisting of ammonium salts, alkali metal salts and alkaline earth salts, all quantities being by weight.

2. A method for making a neutral tasting alcoholic base substrate for the preparation of flavored alcoholic beverages, consisting essentially of the steps of providing an aqueous fermentation medium containing from about 2–20% by weight of a fermentable carbohydrate wherein, from 1 to 25% of said carbohydrate is melt or equivalent malt extract and the remainder of said 2–20% of fermentable carbohydrate is glucose, from about 0.0053 to 0.0080% of hop extract or the equivalent amount of hops which for a hop extract having 17% alpha acids content is equivalent to about 0.0213 to about 0.0319%, from about 0.05 to about 0.20% by weight of soya flakes, and from about 0.04% to about 0.06% by weight of an inorganic salt selected from the group consisting of ammonium salts, alkali metal salts and alkaline earth salts, all quantities being by weight, boiling said aqueous fermentation medium for at least 20 minutes, cooling to between 45° F. and 70° F., adding about 1.0–2.5% by weight of brewer's pitching yeast to said boiled fermentation medium to promote fermentation, allowing the fermentation medium to ferment to completion at a temperature of from 45° F. to about 70° F., cooling the fermented mixture and separating solids from the fermented mixture to obtain a neutral tasting alcoholic substrate.

3. The process as defined in claim 1, further comprising the steps of adding about 0.3 pound of brewer's grade activated carbon per barrel of fermented mixture to adsorb unwanted organic components from said fermented mixture, filtering off said activated carbon with components adsorbed thereon through diatomaceous earth, carbonating said mixture, flavoring said mixture and pasteurizing said mixture.

4. The process as defined in claim 1, further comprising the steps of adding about 0.3 pound of brewer's grade activated carbon per barrel of fermented mixture to adsorb unwanted organic components from said fermented mixture, filtering said activated carbon with components adsorbed thereon through diatomaceous earth, carbonating said mixture, flavoring said mixture and adding 10–12 p.p.m. of n-heptyl p-hydroxybenzoate.

References Cited
UNITED STATES PATENTS

| | | | |
|---|---|---|---|
| 2,692,199 | 10/1954 | Weber | 99—52 X |
| 2,803,546 | 8/1957 | Bergmann et al. | 99—31 |
| 3,332,779 | 7/1967 | Krabbe et al. | 99—31 |
| 2,206,719 | 7/1940 | Draeger | 99—30 |
| 3,175,912 | 3/1965 | Strandskov et al. | 99—48 |

DAVID M. NAFF, Primary Examiner

426—11, 192, 229, 335, 521